(12) United States Patent
Peterson et al.

(10) Patent No.: US 11,196,668 B2
(45) Date of Patent: Dec. 7, 2021

(54) END USER PREMISES DEVICE CONTROLLER

(71) Applicant: Entry Point, LLC, Salt Lake City, UT (US)

(72) Inventors: Jeffrey Peterson, Idaho Falls, ID (US); Eric Turner, Idaho Falls, ID (US)

(73) Assignee: Entry Point, LLC, Salt Lake City, UT (US)

( * ) Notice: Subject to any disclaimer, the term of this patent is extended or adjusted under 35 U.S.C. 154(b) by 16 days.

(21) Appl. No.: 16/853,963

(22) Filed: Apr. 21, 2020

(65) Prior Publication Data
US 2021/0328916 A1    Oct. 21, 2021

(51) Int. Cl.
*H04L 12/713* (2013.01)
*H04L 12/741* (2013.01)

(52) U.S. Cl.
CPC .......... *H04L 45/586* (2013.01); *H04L 45/745* (2013.01)

(58) Field of Classification Search
CPC combination set(s) only.
See application file for complete search history.

(56) References Cited

U.S. PATENT DOCUMENTS

| | | | |
|---|---|---|---|
| 2013/0081112 A1* | 3/2013 | Kelly | H04L 9/3271 726/4 |
| 2013/0139243 A1* | 5/2013 | Poola | H04W 12/088 726/11 |
| 2013/0227566 A1* | 8/2013 | Higuchi | G06F 9/45558 718/1 |
| 2016/0329965 A1* | 11/2016 | Cook | H04B 10/27 |
| 2016/0337206 A1* | 11/2016 | Bugenhagen | H04L 12/28 |
| 2018/0006935 A1* | 1/2018 | Mutnuru | H04L 45/02 |
| 2019/0223023 A1* | 7/2019 | Altay | H04W 4/50 |

* cited by examiner

*Primary Examiner* — Xavier S Wong
(74) *Attorney, Agent, or Firm* — Kirton McConkie; Brian Tucker (57) ABSTRACT

A dynamic open access software-defined network can be configured to enable an end user premises device to function like a controller so that there is no need to employ a controller within the network. As a result, a dynamic open access software-defined network can be efficiently and effectively scaled. An end user premises device can be configured with a virtual switch that implements a flow receiver for receiving flows directly from a flow communicator of a management server without utilizing a controller or the Openflow protocol. The virtual switch may also be configured to store flows in a configuration file that is persisted across reboots on the end user premises device to thereby enable the end user premises device to rebuild a flow table without communicating with an external component.

20 Claims, 8 Drawing Sheets

END USER PREMISES DEVICE CONTROLLER

CROSS-REFERENCE TO RELATED APPLICATIONS

N/A

BACKGROUND

Software-defined networking (SDN) is a general term which includes a number of networking technologies. SDN aims to separate the control plane of the network from the data plane of the network to create an agile and flexible network. In a software-defined network, the switch(es) or other components that form the physical topology of the network can communicate with the controller, which is software that manages the control plane of the network, to determine how frames should be directed within the network. In this way, the controller can create, modify, or remove network services dynamically. These services are connections that are provisioned between two network endpoints.

During this provisioning of services, the physical topology of the network remains unchanged. Instead, to provision a service (e.g., between a user's home and an edge switch of a provider), the controller will typically employ knowledge of the network topology including how the endpoints are physically interconnected, current traffic on the network, and any quality of service requirements (among possible other factors) to select and create a virtual network between the endpoints. This is accomplished by programming the appropriate switches or other components to forward frames pertaining to the service so that they traverse a selected path to reach their endpoint. In some implementations, only components located at the edge of the network topology may implement this software-defined networking technique.

Various protocols and techniques exist for provisioning services in this manner. For example, a software-defined network may be configured to employ VLAN tags (or other identifiers) within the frames to define to which service the frames pertain. By accessing the VLAN tag in a frame it receives, a switch can determine, based on its programmed rules (or flows), how to forward the frame so that the frame traverses the path that was defined for that service. In this type of environment, frames pertaining to multiple services can be transferred over the same physical wire but remain isolated due to the VLAN tags they include.

Figure 1:
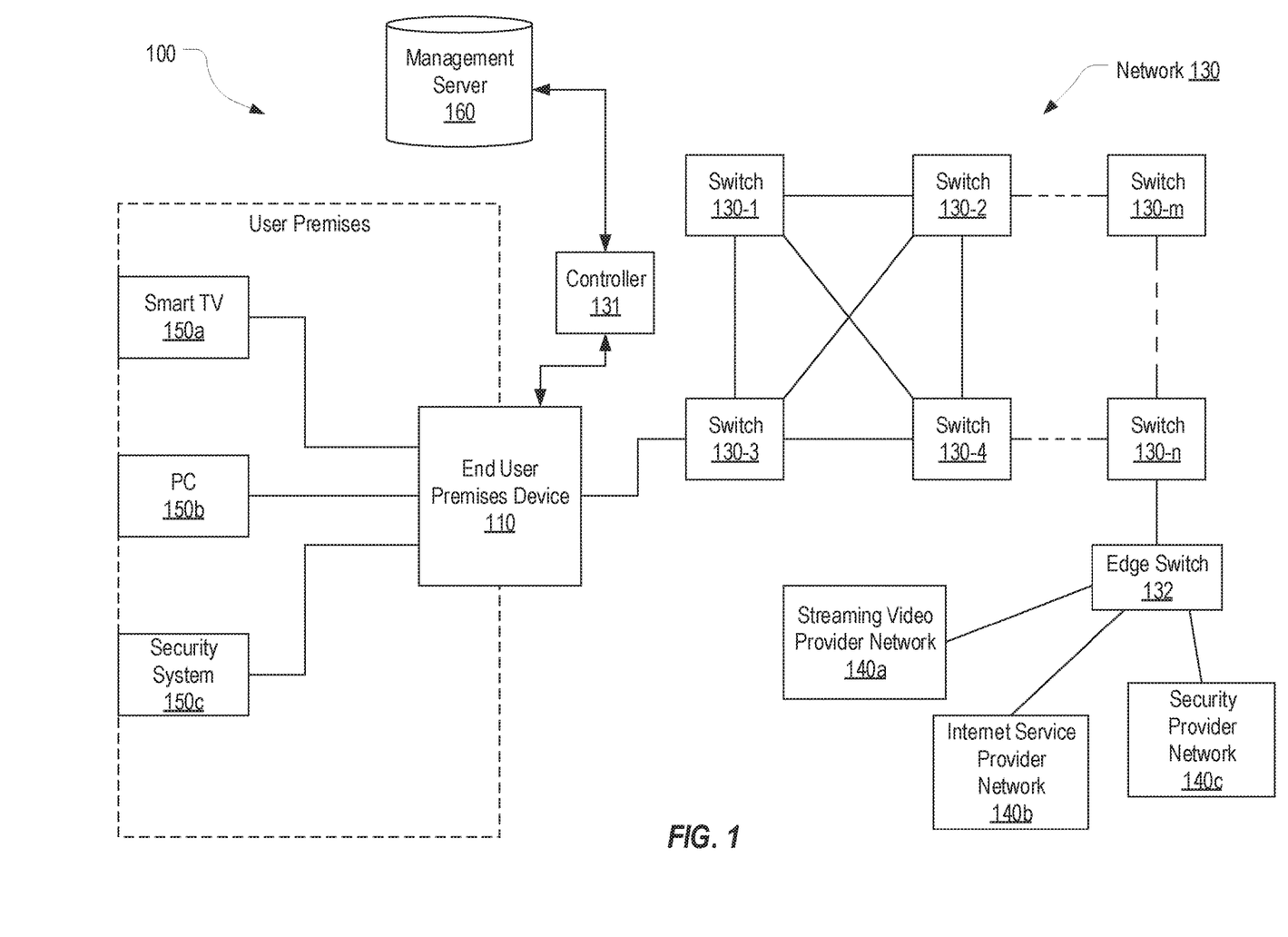
FIG. 1 illustrates an example of a software-defined networking architecture that employs one or more controllers for configuring and managing edge switches.

FIG. 1 provides a simplified example of a software-defined network architecture 100. Architecture 100 includes a network 130 that consists of a number of interconnected core switches 130-1 through 130-*n* (where n can represent any integer) that form a switching fabric. A number of entities can connect to network 130 including service providers and end users. Service providers may typically include a network that connects to network 130 via an edge switch 132. In contrast, an end user may typically employ an end user premises device 110 to connect to network 130.

In the example depicted in FIG. 1, a streaming video provider network 140*a* (e.g., Netflix, Hulu, Sling, etc.), an internet service provider network 140*b*, and a security provider network 140*c* are each connected to a particular port of edge switch 132. Additionally, a user's premises (e.g., a home or business location) is shown as including a smart TV 150*a*, a PC 150*b* and a security system 150*c*, each of which is connected to end user premises device 110.

Architecture 100 can represent a dynamic open access software-defined network in which controller 131 may be employed to dynamically configure end user premises device 110 to provision any available service that the end user may request. To enable this on-demand provisioning of services, end user premises device 110 may typically run a version of the Open vSwitch software to cause it to function as a virtual switch. Controller 131 may also typically use the Openflow protocol to communicate with the instance of Open vSwitch (OVS) running on end user premises device 110. For example, to dynamically provision a streaming video service at the user's premises, controller 131 can send Openflow commands to instruct the OVS on end user premises device 110 to implement particular rules (or flows) that will cause frames to be delivered between streaming video provider network 140*a* and smart TV 150*a*. A management server 160 may be employed to oversee this provisioning of services. For example, management server 160 could instruct controller 131 to provision a service on end user premises device 110, but controller 131 would implement the Openflow protocol to cause the OVS on end user premises device 110 to update its flow table to provision the service.

The Openflow protocol requires constant communication between the controller and each switch. In traditional software defined networks, there are a limited number of switches even in large networks. In contrast, in dynamic open access software defined networks, each end user premises device functions as an edge switch and must therefore communicate constantly with the controller. Because each communication requires the controller to perform some computation, a single controller can only manage a relatively small number of end user premises devices. In other words, the size of a dynamic open access software defined network is typically limited by the computational capacity of the controller.

If a controller is used to manage too many end user premises devices, the controller will likely become overwhelmed with requests from the end user premises devices and may fail to provide timely responses or may even stop responding altogether. When an end user premises device fails to receive a timely response, it will likely repeat its request further exacerbating the controller's overload. In some cases, the controller may even treat an end user premises device's repeated requests as hostile and may block further communications from the end user premises device. When this occurs, it will no longer be possible to provision new services or modify existing services at the end user premises device, at least without manual intervention. The end user premises device may even cease to provide access to existing services.

One way in which such issues can be addressed is by increasing the computational resources of the controller. Yet, even with very powerful hardware, a single controller will not be capable of supporting a large number of end user premises devices. Another way to address such issues is to segment the network and employ a separate controller for each segment. Yet, a segmented network, along with the many controllers it would require, creates significant logistical and maintenance overhead. Therefore, as a practical matter, dynamic open access software defined networks are limited in size and do not scale to larger networks.

BRIEF SUMMARY

The present invention is generally directed to end user premises devices, software-defined networks that employ end user premises devices and methods, systems and computer program products for enabling an end user premises device to function like a controller within a software-defined network architecture. Because each end user premises device can function like a controller, there is no need to employ a controller within the software-defined network architecture. As a result, a dynamic open access software-defined network can be efficiently and effectively scaled.

An end user premises device can be configured with a virtual switch that implements a flow receiver for receiving flows directly from a flow communicator of a management server without utilizing a controller or the Openflow protocol. The virtual switch may also be configured to store flows in a configuration file that is persisted across reboots on the end user premises device to thereby enable the end user premises device to rebuild a flow table without communicating with an external component.

In some embodiments, the present invention may be implemented as a method for managing end user premises devices in a software-defined network. A management server may identify a first flow that is to be implemented on a first end user premises device to provide a service to an end user's premises where the first end user premises device is located. A flow communicator on the management server may then send one or more communications to a flow receiver of a first virtual switch that is executing on the first end user premises device. The one or more communications define the first flow. In response to the flow receiver receiving the one or more communications from the management server, the first virtual switch can create the first flow in a flow table maintained by the first virtual switch.

In some embodiments, the present invention may be implemented as a software-defined network that includes a management server having a flow communicator and a plurality of end user premises devices. Each end user premises device is configured to provide services to an end user's premises where the end user premises device is located. Each end user premises device implements a virtual switch having a flow receiver that is configured to receive communications directly from the flow communicator of the management server. The communications define one or more flows that the respective virtual switch is to implement.

In some embodiments, the present invention is implemented as computer storage media storing computer executable instructions which when executed implement a method for provisioning flows on end user premises devices in a software-defined network. A management server can identify a first flow that is to be implemented on a first end user premises device to provide a service to an end user's premises where the first end user premises device is located. The management server may then send one or more communications directly to a first virtual switch that is executing on the first end user premises device. The one or more communications define the first flow. In response to receiving the one or more communications from the management server, the first virtual switch creates the first flow in a flow table maintained by the first virtual switch.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification and the claims, an "end user premises device" should be construed as an electronic device that is employed as an edge device or edge switch at an end user's premises in a software-defined network (SDN) architecture. The term "flow" should be construed in accordance with its SDN meaning. For example, a flow can be defined as an entry in a flow table where the entry includes a rule and instructions for handling a communication that matches the rule among other information. Accordingly, in the context of an end user premises device, flows applied on the end user premises device can define how the end user premises device should handle communications it receives whether incoming or outgoing. A rule of a flow can define a variety of matching criteria including, for example, a communication's source or destination MAC or IP addresses, VLAN tag, and the port at which the communication is received, among various other criteria.

Figure 2:
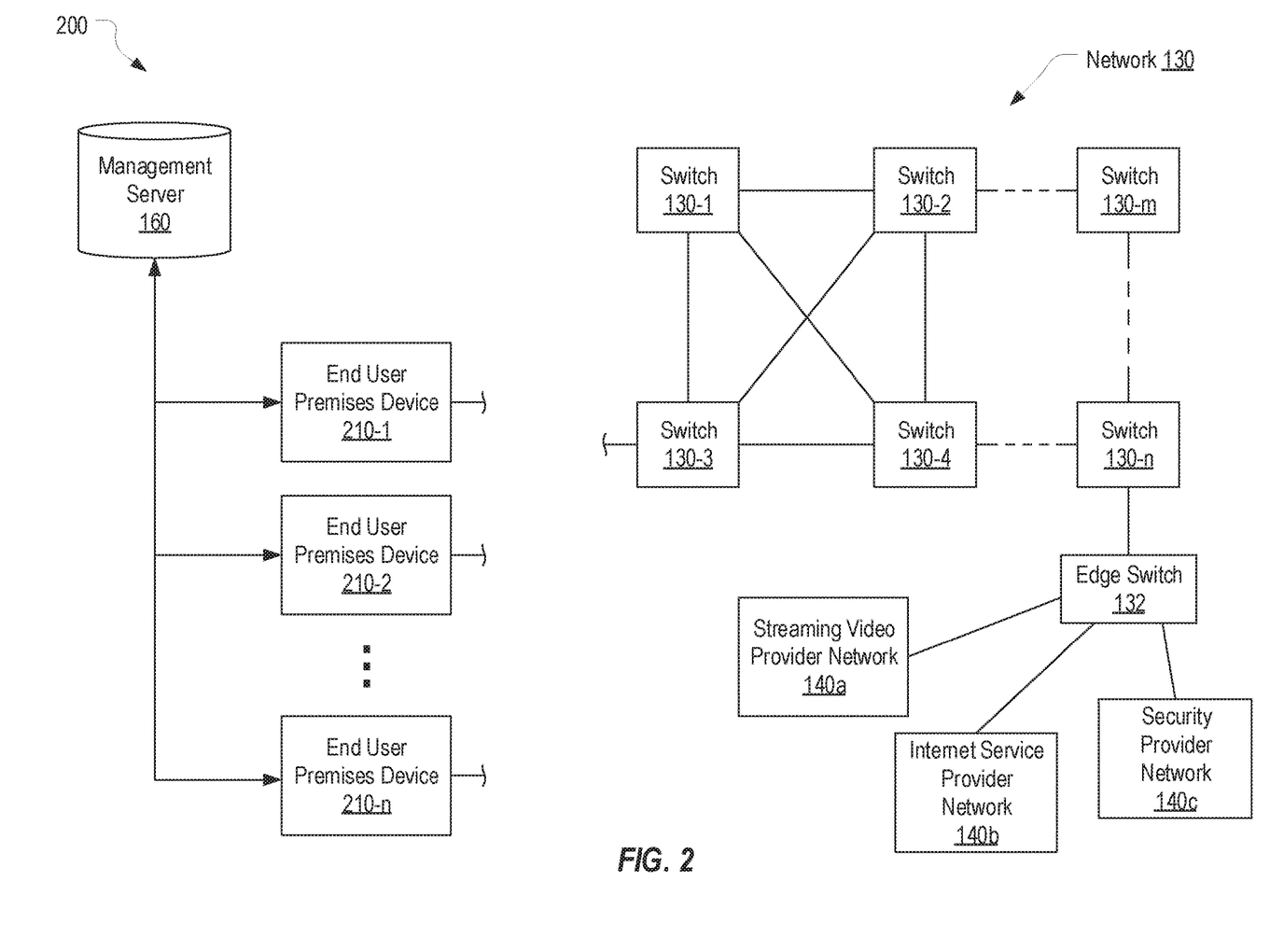
FIG. 2 illustrates an example of a software-defined networking architecture that is configured in accordance with one or more embodiments of the present invention.

FIG. 2 illustrates an example SDN architecture 200 that is configured in accordance with embodiments of the present invention. To simplify the description, SDN architecture 200 includes the same configuration of network 130 and provider networks 140a-140c as depicted in FIG. 1. This is also intended to represent that embodiments of the present invention can be implemented in existing networks.

In contrast to FIG. 1, SDN architecture 200 does not include controller 131 and need not include any controller for managing end user premises devices in SDN architecture 200. Instead, management server 160 and end user premises devices 210-1 through 210-n (collectively end user premises devices 210) communicate directly. To enable this direct communication, including management server 160's direct management of end user premises devices 210, both management server 160 and each of end user premises devices 210 can employ a unique configuration as described below. This configuration enables end user premises devices 210 themselves to function like "controllers" within SDN architecture 200. In this context, an end user premises device functioning like a controller is not intended to mean that the end user premises device performs the functionality that controller 131 would have otherwise provided, but rather that the end user premises device is configured in a manner that allows it to be managed and to operate without the involvement of a controller. In FIG. 2, each of end user premises devices 210 is shown as being connected to switch 130-3. It is noted, however, that end user premises devices 210 could be connected to any of the switches in network 130.

Figure 3:
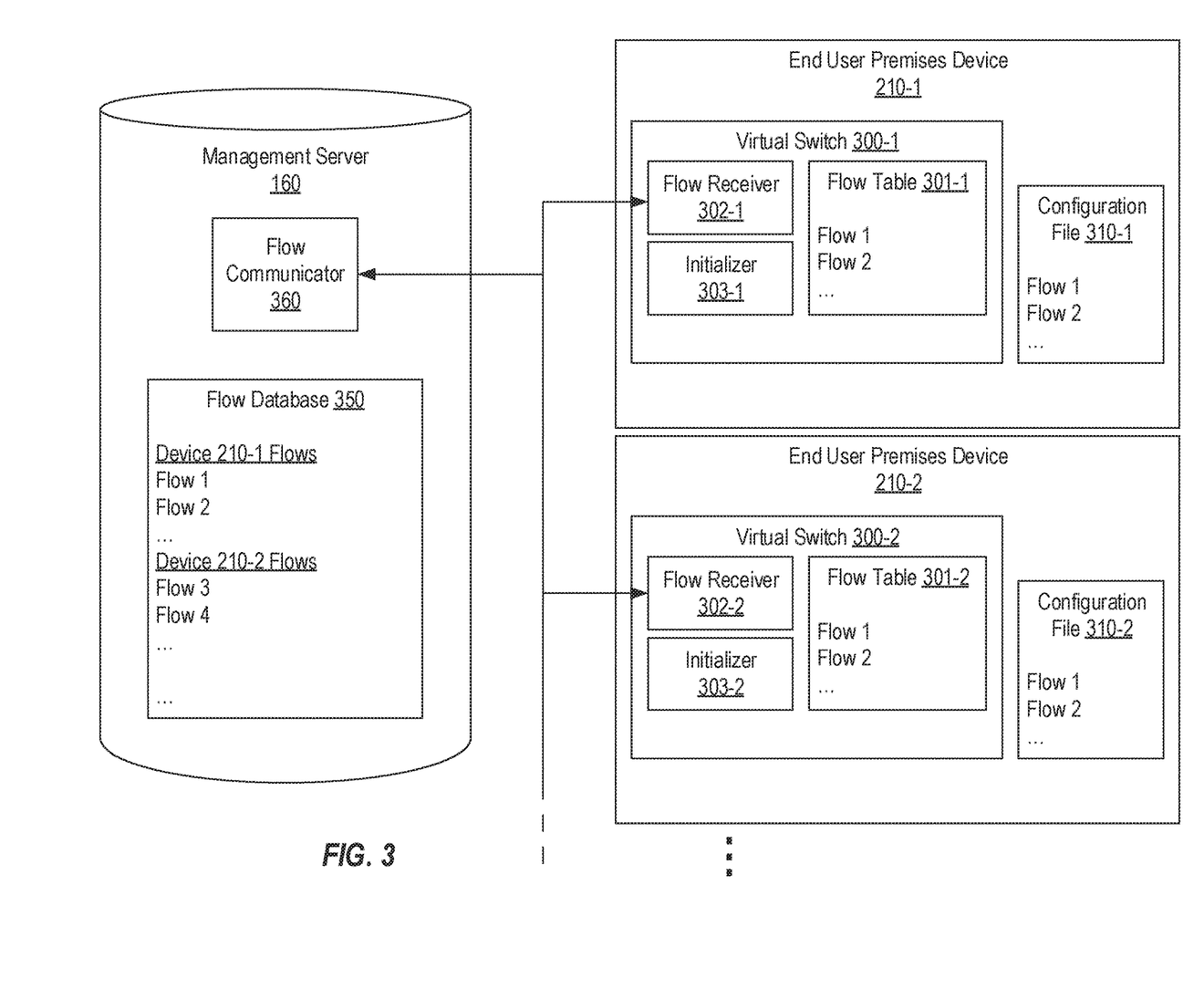
FIG. 3 illustrates an example of components that may be employed on a management server and an end user premises device to enable embodiments of the present invention to be implemented.

FIG. 3 provides an example of components that may be configured on management server 160 and end user premises devices 210 to enable management server 160 to directly manage each end user premises device 210 and for each end user premises device 210 to function like a controller. In this context, direct management represents that management server 160 does not employ a controller for the purpose of managing end user premises devices 210. Notably, by not employing a controller, there is no need to implement the Openflow protocol (or equivalent protocol) within SDN architecture 200.

As shown in FIG. 3, management server 160 maintains a flow database 350 which defines the flows that should be applied on each end user premises device 210 in SDN architecture 200. Management server 160 also includes a flow communicator 360 that is configured to communicate with each virtual switch 300-1 through 300-n (collectively virtual switches 300) on end user premises devices 210. As further described below, in some embodiments, flow communicator 360 can be configured to communicate using an application programming interface (API) for the purpose of providing flows to the virtual switch. Notably, flow communicator 360 does not employ the Openflow protocol for this purpose. In other words, management server 160 does not function as a controller in SDN architecture 200.

Each end user premises device 210 implements a virtual switch 300 (e.g., a customized instance of the Open vSwitch software). Each virtual switch 300 can maintain a flow table 301-1 through 301-n (or collectively flow tables 301) in which the flows applied on the end user premises device are defined. Each virtual switch 300 can also be configured to implement a flow receiver 302-1 through 302-n (or collectively flow receivers 302) which, in some embodiments, may provide an API for allowing flow communicator 360 to send communications containing flows to the virtual switch (e.g., a REST API, a GraphQL API, a gRPC API, etc.). Notably again, virtual switches 300 do not implement the Openflow protocol for the purpose of receiving such communications. Flow receivers 302 can also be configured to update flow tables 301 to include flows defined in such communications.

Each end user premises device 210 may also maintain a configuration file 310-1 through 310-n (collectively configuration files 310) in which each flow applied on the respective end user premises device is defined and persisted across reboots. Notably, in a typical implementation of a virtual switch, the flows defined in a flow table would be lost at reboot thus requiring the virtual switch to communicate with a controller using the Openflow protocol to retrieve the applicable flows and rebuild its flow table. By maintaining configuration files 310, after a reboot, end user premises devices 210 can relaunch virtual switches 300 which can in turn employ configuration files 310 to rebuild the respective flow tables and connect to network 130 without needing to communicate with a controller. To enable this rebuilding of flow tables 301, virtual switches 300 can also be configured to implement initializers 303-1 through 303-n (or collectively initializers 303) that are configured to access configuration files 310 and employ the flows defined therein to rebuild flow tables 301 as part of the loading/initialization of virtual switches 300 after a reboot.

Figure 4A:
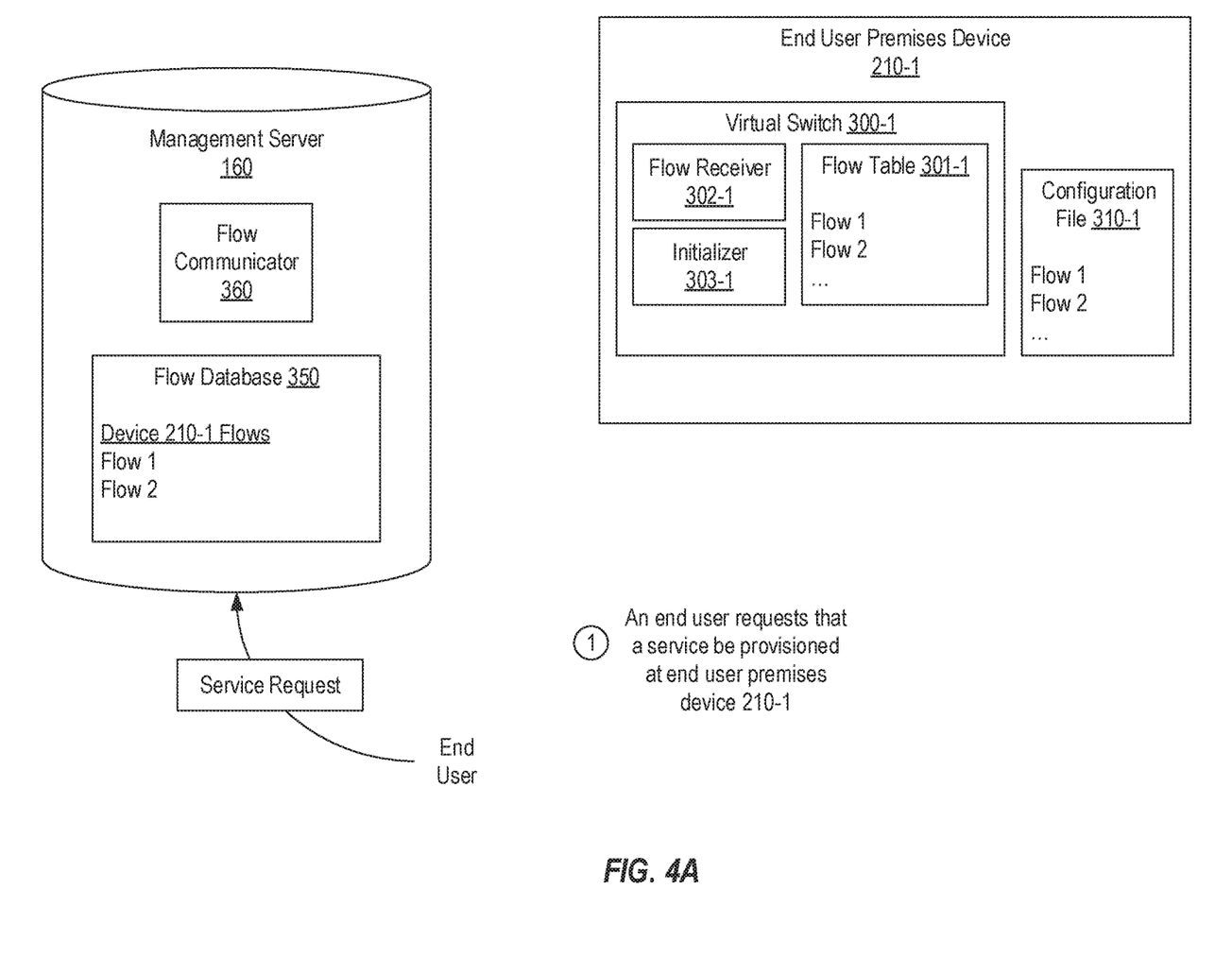
FIGS. 4A-4E provide an example of functionality that a management server and an end user premises device can perform to implement embodiments of the present invention.

FIGS. 4A-4E illustrate an example of how management server 160 and end user premises devices 210 can function in some embodiments of the present invention. In FIG. 4A, it is assumed, in step 1, that an end user requests that a service be provisioned at end user premises device 210-1. For example, a homeowner could use his or her computing device that is connected to end user premises device 210-1 to submit a request to provision a streaming video service to his or her home where end user premises device 210-1 is located. However, the manner in which the service request is received is not essential to the present invention.

Figure 4B:
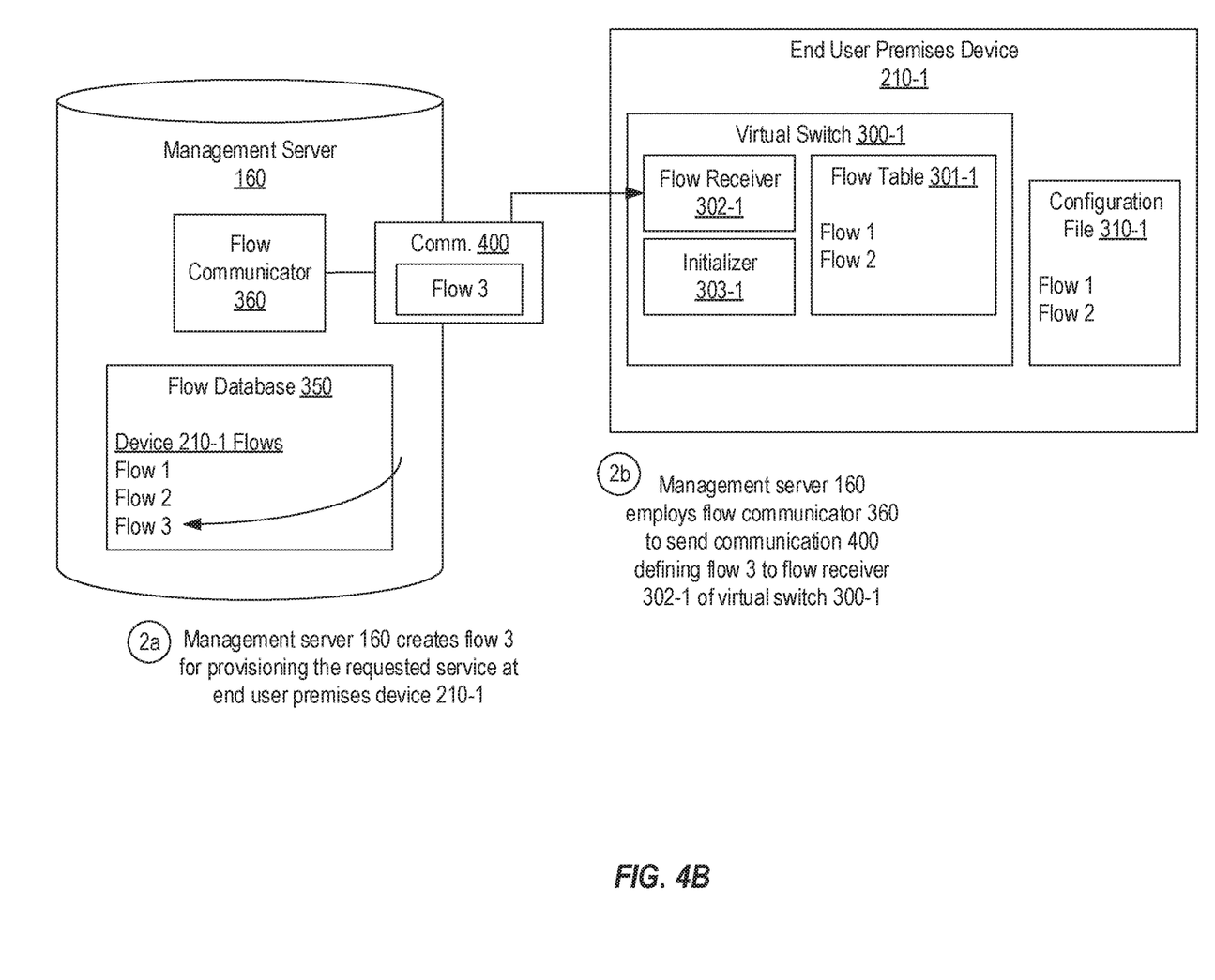

Turning to FIG. 4B, in step 2a and in response to the service request, management server 160 can create flow 3 (or information defining flow 3) for provisioning the requested service at end user premises device 210-1 and store it in flow database 350 in association with end user premises device 210-1. In step 2b, management server 160 can also employ flow communicator 360 to send a communication 400 to flow receiver 302-1 of virtual switch 300-1 on end user premises device 210-1. Communication 400 can include flow 3 (or information defining flow 3) and can be sent via an API, SSH or other networking technique that flow receiver 302-1 implements for receiving such communications.

Figure 4C:
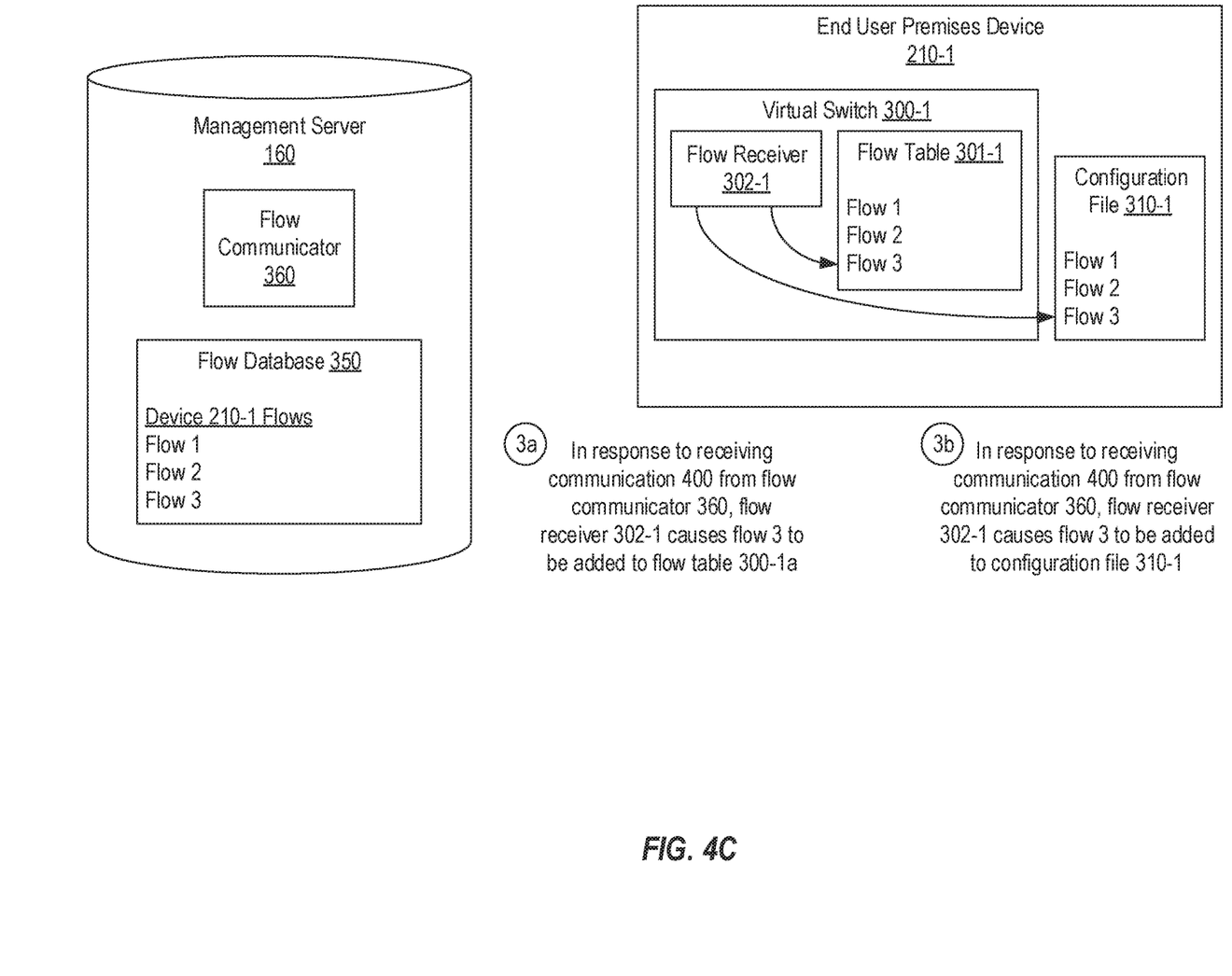

Turning to FIG. 4C, in step 3a and in response to receiving communication 400 from flow communicator 360, flow receiver 302-1 adds flow 3 to flow table 301-1 (or causes flow 3 to be added to flow table 301-1). Also, in step 3b, flow receiver 302-1 adds flow 3 (or information defining flow 3) to configuration file 310-1 (or causes flow 3 to be added to configuration file 310-1). At this point, any communication received at end user premises device 210-1 which matches the rule(s) of flow 3 can be processed in accordance with the corresponding instructions. For example, flow 3 could define a VLAN tag that should be added to communications that end user premises device 210-1 directs over network 130 so that the communications will be delivered to a particular streaming video service provider's network.

Figure 4D:
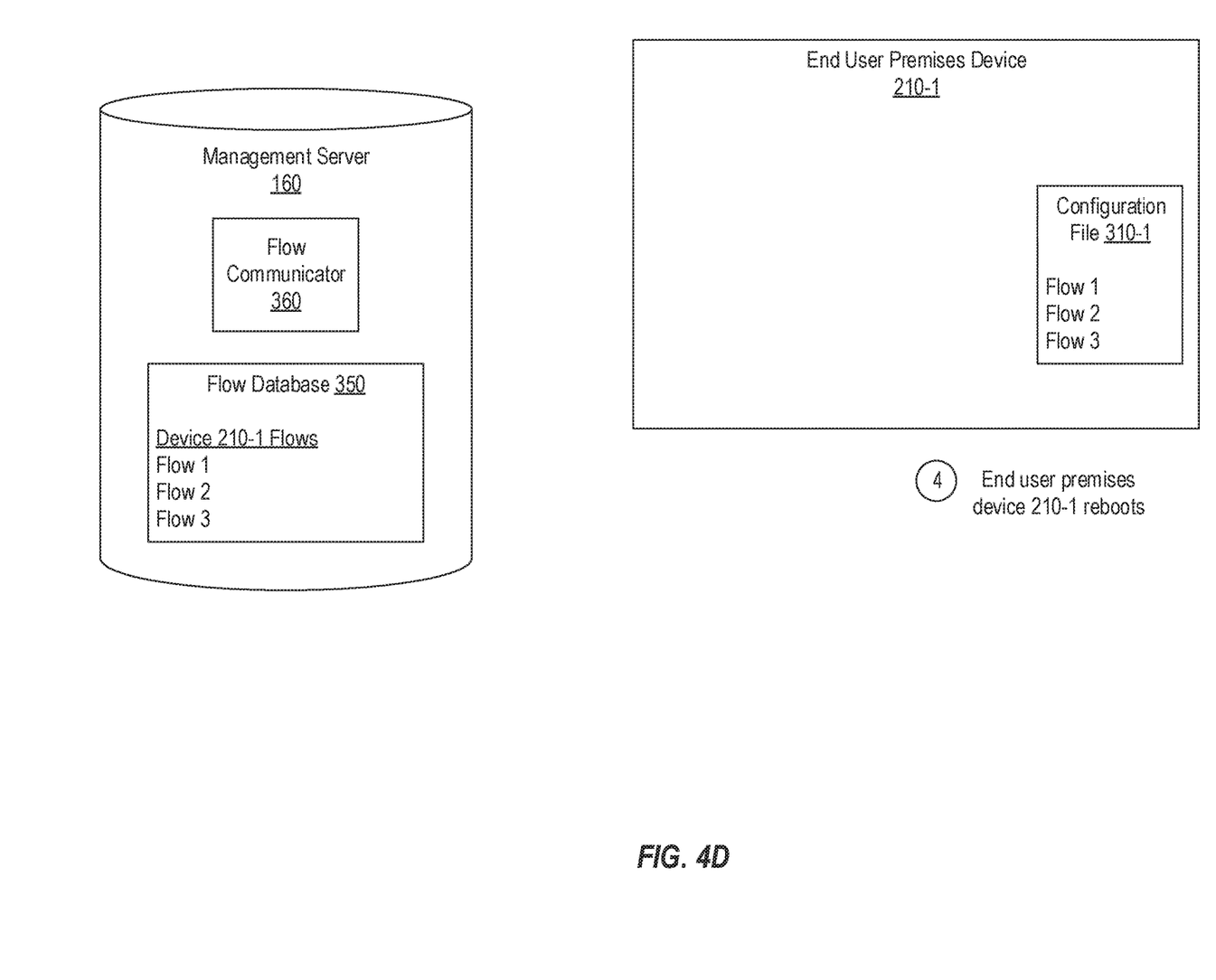

Turning to FIG. 4D, in step 4, it is assumed that end user premises device 210-1 reboots. For example, end user premises device 210-1 could lose power or could be intentionally rebooted. As depicted, this reboot would terminate virtual switch 300-1 causing flow table 301-1 to be lost. However, configuration file 310-1, which may be maintained on non-volatile storage media, is persisted across the reboot and will therefore retain the definitions of each flow that should be implemented on end user premises device 210-1.

Figure 4E:
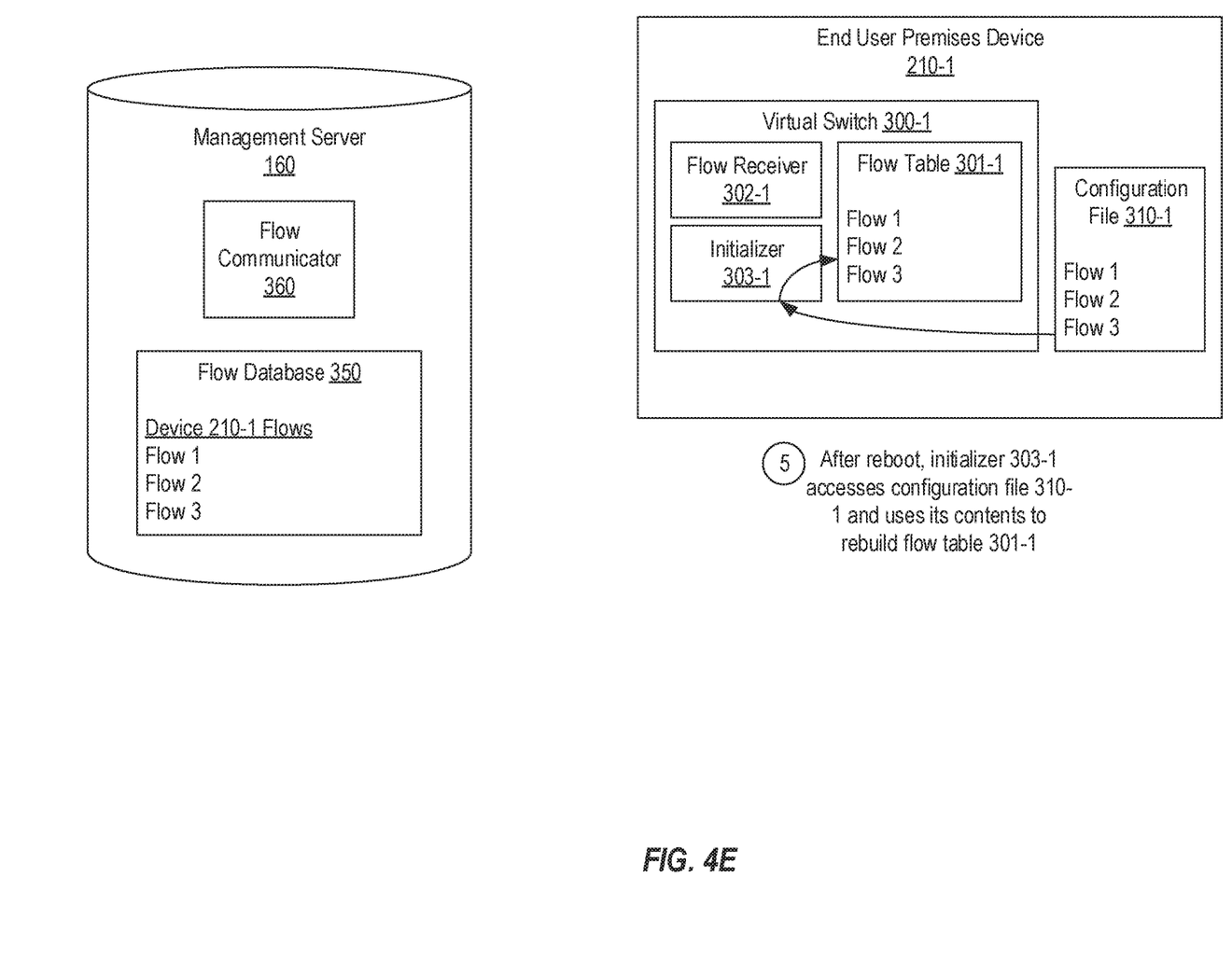

Turning to FIG. 4E, in step 5, end user premises device 210-1 loads and initializes virtual switch 300-1 after the reboot. Initializer 303-1 can then access configuration file 310-1 to retrieve the flows defined therein and use them to rebuild flow table 301-1 on virtual switch 300-1. Once flow table 301-1 is rebuilt, virtual switch 300-1 will again provide access to network 130 including providing access to each service that had been provisioned prior to the reboot. Notably, virtual switch 300-1 can perform this functionality without communicating with a controller or even management server 160.

Due to the configuration of management server 160 and end user premises devices 210, very large dynamic open access software-defined networks can be implemented. For example, to provision services within a network having thousands of end user premises devices 210, management server 160 can employ flow communicator 360 to send communications defining corresponding flows directly to the appropriate end user premises devices while the end user premises devices themselves can implement the flows—all without employing any controllers or the Openflow protocol. As additional end user premises devices are added to the network, there will be minimal additional overhead since each end user premises device can function as a controller for the purpose of interfacing with management server 160 to receive and implement new flows for that particular end user premises device.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing end user premises devices in a software-defined network (SDN), each end user premises device functioning as an edge device or an edge switch at an end user's premises in the SDN, the method comprising:
    identifying, by a management server, a first flow that is to be implemented on a first end user premises device to provide a service to a first end user's premises where the first end user premises device is located;
    sending, by a flow communicator on the management server, one or more communications to a flow receiver of a first virtual switch that is executing on the first end user premises device, the one or more communications defining the first flow that is to be implemented on the first end user premises device to provide the service to the first end user's premises where the first end user premises device is located; and
    in response to the flow receiver receiving the one or more communications from the management server, creating, by the first virtual switch, the first flow in a flow table maintained by the first virtual switch that is executing on the first end user premises device to thereby provide the service to the first end user's premises where the first end user premises device is located.

2. The method of claim 1, further comprising:
    storing, by the management server and in a flow database, the flow in association with the first end user premises device.

3. The method of claim 1, wherein the flow communicator sends the one or more communications to the flow receiver using an application programming interface provided by the flow receiver.

4. The method of claim 1, wherein the flow communicator sends the one or more communications to the flow receiver using the Secure Shell protocol.

5. The method of claim 1, wherein the flow communicator sends the one or more communications to the flow receiver without employing the Openflow protocol.

6. The method of claim 1, further comprising:
    in response to the flow receiver receiving the one or more communications from the management server, storing, by the first virtual switch, the first flow in a configuration file stored on the first end user premises device.

7. The method of claim 6, further comprising:
    rebuilding, by an initializer of the first virtual switch, the flow table using the configuration file.

8. The method of claim 7, wherein rebuilding the flow table using the configuration file comprises, after a reboot of the first end user premises device:
    reading each flow defined in the flow table; and
    causing each flow to be created in the flow table.

9. The method of claim 1, further comprising:
    identifying, by the management server, a second flow that is to be implemented on a second end user premises device to provide a service to a second end user's premises where the second end user premises device is located;
    sending, by the flow communicator on the management server, one or more additional communications to a flow receiver of a second virtual switch that is executing on the second end user premises device, the one or more additional communications defining the second flow that is to be implemented on the second end user premises device to provide the service to the second end user's premises where the second end user premises device is located; and
    in response to the flow receiver of the second virtual switch receiving the one or more additional communications from the management server, creating, by the second virtual switch, the second flow in a flow table maintained by the second virtual switch that is executing on the second end user premises device to thereby provide the service to the second end user's premises where the second end user premises device is located.

10. The method of claim 9, wherein the flow receiver of the first virtual switch and the flow receiver of the second virtual switch communicate directly with the flow communicator on the management server.

11. A software-defined network (SDN) comprising:
a management server having a flow communicator; and
a plurality of end user premises devices that each function as an edge device or an edge switch at an end user's premises in the SDN, each end user premises device being configured to provide services to the respective end user's premises where the respective end user premises device is located, each end user premises device implementing a virtual switch having a flow receiver that is configured to receive communications directly from the flow communicator of the management server, the communications defining one or more flows that the respective virtual switch is to implement to thereby provide a service to the respective end user's premises where the respective end user premises device is located.

12. The software-defined network of claim 11, wherein each flow receiver is configured to receive the communications directly from the flow communicator without employing the Openflow protocol.

13. The software-defined network of claim 11, wherein each flow receiver is configured to store the one or more flows in a configuration file on the respective end user premises device.

14. The software-defined network of claim 13, wherein each virtual switch also has an initializer that is configured to rebuild a flow table using the respective configuration file.

15. The software-defined network of claim 11, wherein the management server maintains a flow database which associates each end user premises device with each flow that the respective virtual switch is to implement.

16. One or more computer storage media storing computer executable instructions which when executed implement a method for provisioning flows on end user premises devices in a software-defined network (SDN), each end user premises device functioning as an edge device or an edge switch at an end user's premises in the SDN, the method comprising:
identifying, by a management server, a first flow that is to be implemented on a first end user premises device to provide a service to a first end user's premises where the first end user premises device is located;
sending, by the management server, one or more communications directly to a first virtual switch that is executing on the first end user premises device, the one or more communications defining the first flow that is to be implemented on the first end user premises device to provide the service to the end user's premises where the first end user premises device is located; and
in response to receiving the one or more communications from the management server, creating, by the first virtual switch, the first flow in a flow table maintained by the first virtual switch that is executing on the first end user premises device to thereby provide the service to the end user's premises where the first end user premises device is located.

17. The computer storage media of claim 16, wherein the method further comprises:
in response to receiving the one or more communications from the management server, storing, by the first virtual switch, the first flow in a configuration file maintained on the first end user premises device.

18. The computer storage media of claim 17, wherein the method further comprises:
as part of a reboot of the first end user premises device, accessing, by the first virtual switch, the configuration file to rebuild the flow table.

19. The computer storage media of claim 16, wherein the method further comprises:
identifying, by the management server, a second flow that is to be implemented on a second end user premises device to provide a service to a second end user's premises where the second end user premises device is located;
sending, by the management server, one or more additional communications directly to a second virtual switch that is executing on the second end user premises device, the one or more additional communications defining the second flow that is to be implemented on the second end user premises device to provide the service to the second end user's premises where the second end user premises device is located; and
in response to receiving the one or more additional communications from the management server, creating, by the second virtual switch, the second flow in a flow table maintained by the second virtual switch that is executing on the second end user premises device to thereby provide the service to the second end user's premises where the second end user premises device is located.

20. The computer storage media of claim 19, wherein the method further comprises:
in response to receiving the one or more additional communications from the management server, storing, by the second virtual switch, the second flow in a configuration file maintained on the second end user premises device.

* * * * *